Figure 3:
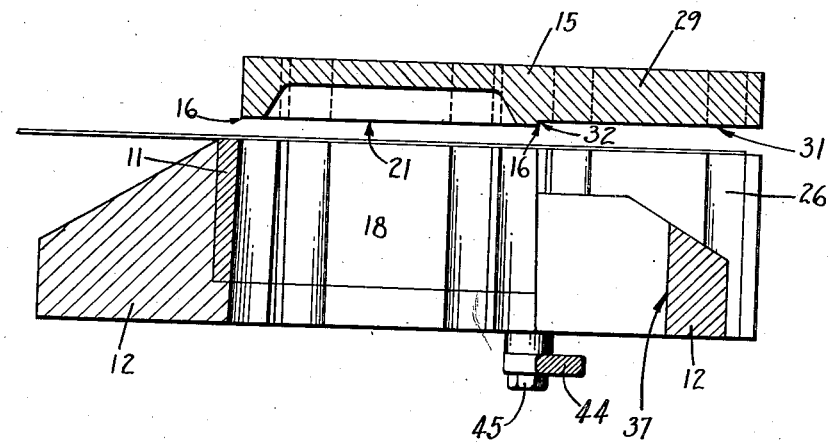

April 2, 1940.  W. R. HULL  2,196,168
BLANK SHEARING MACHINE
Filed April 25, 1939   2 Sheets-Sheet 1
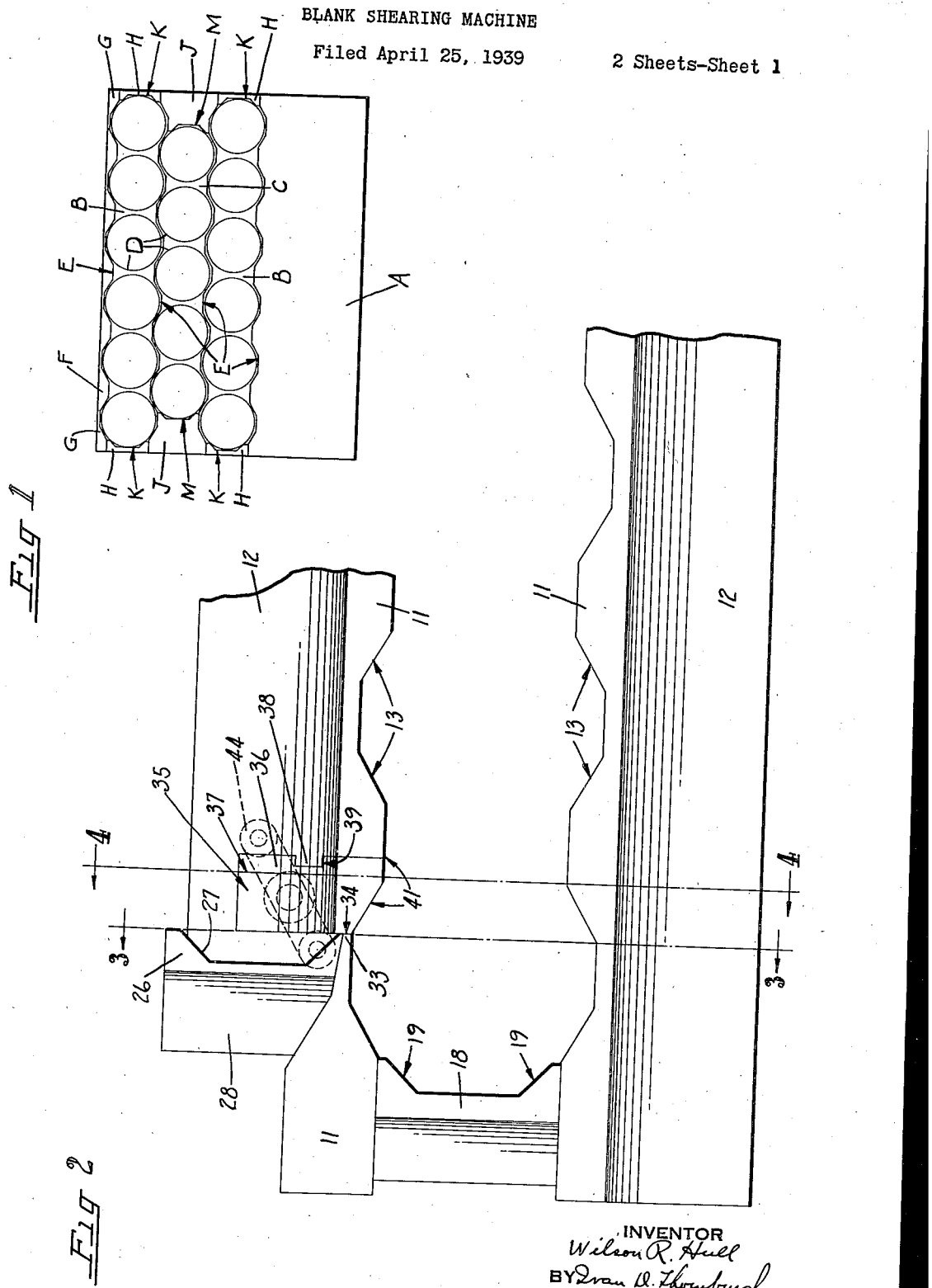

April 2, 1940.     W. R. HULL     2,196,168
BLANK SHEARING MACHINE
Filed April 25, 1939     2 Sheets-Sheet 2

INVENTOR
Wilson R. Hull
BY
ATTORNEYS

Patented Apr. 2, 1940

2,196,168

UNITED STATES PATENT OFFICE 2,196,168

BLANK SHEARING MACHINE

Wilson R. Hull, Mamaroneck, N. Y., assignor to American Can Company, New York, N. Y., a corporation of New Jersey Application April 25, 1939, Serial No. 270,023

10 Claims. (Cl. 164—18)

The present invention relates to sheet metal blank shearing machines such as scroll shears and the like and has particular reference to die cutting along two lines of severance in the same place, one disposed at an angle to the other and extending into the other.

Heretofore considerable difficulty has been experienced in certain kinds of die cutting where a metal sheet is cut along two angularly disposed lines of severance. By way of example, one form of such work is severing from a metallic sheet, the well known scroll strips and recovery pieces used in the can making industry. In the usual scroll shear die the recovery cutting blade is located at a lower level than that of the die cutting edge. Hence the portion of the metal sheet from which the recovery piece is to be cut is pushed down to the blade before being cut. As the recovery blade becomes dull a tearing action is obtained which results in burrs being left on the recovery pieces and on the ends of the strips in the portion of the sheet from which the strips are cut. This tearing of the sheet metal also results in a rounding off of the main die steels adjacent the recovery blade and therefore requires too frequent grinding or sharpening of the entire unit.

The present invention contemplates overcoming this difficulty by locating the recovery blade outside of but adjacent the main die steels, the cut edge of the blade being disposed at an angle to and extending into the cut edge of the steels, the cut edges of the blade and the steels being in the same plane, and providing a receding section in the main die steel adjacent the recovery blade so that depression of the receding section after its use in cutting a strip from the sheet will expose the recovery blade cut edge for use in severing the recovery piece from an adjacent strip.

An object therefore of the invention is the provision in a shearing machine of a shearing die having a shearing edge and also having an auxiliary cutting edge in the same plane with the shearing edge and disposed at an angle to and extending into the shearing edge, and having a yieldable element which is movable relative to the shearing die after a cutting action along the shearing edge to make effective a cutting action along the auxiliary cutting edge so that metal sheets may be cut along angularly disposed lines of severance without forming undesirable burrs at the intersection of the cuts so made.

Numerous other objects and advantages of the invention will be apparent as it is better understood from the following description, which, taken in connection with the accompanying drawings, discloses a preferred embodiment thereof.

Figure 4:
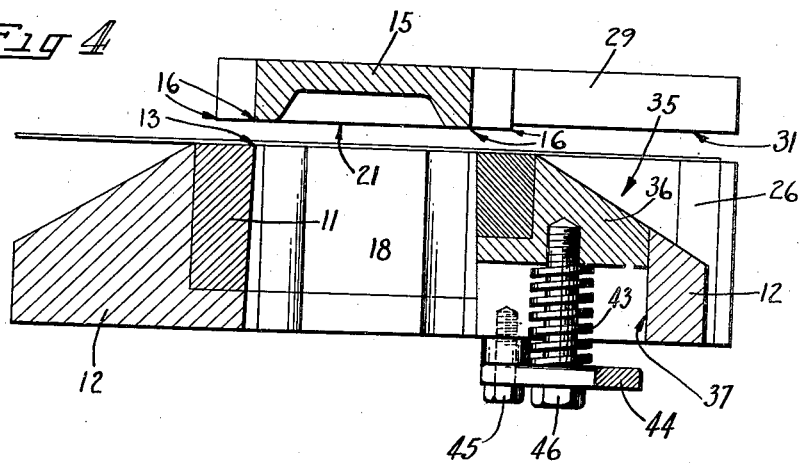

Referring to the drawings:

Figure 1 is a plan view of a sheet of tinplate showing the lines of severance along which the plate is divided to form strips from which circular blanks may be subsequently cut and also to provide the recovery pieces and scrap trim;

Fig. 2 is an enlarged plan view of a shearing die embodying the instant invention and which may be used in cutting the sheet shown in Fig. 1, with parts broken away; and Figs. 3 and 4 are transverse sections taken substantially along the lines 3—3 and 4—4 in Fig. 2, the views also illustrating the punch which cooperates with the die and showing the sheet of tinplate in place ready to be cut.

As a preferred embodiment of the invention the drawings illustrate the principal die parts of a shearing machine for cutting sheets A (Fig. 1) of tinplate into trimmed-to-length long and short strips B, C, respectively, from which can end blanks or the like indicated by lines D may be subsequently removed. For a stagger row layout, such as is illustrated in the drawings, the sheet is preferably cut along undulated lines of severance E. In cutting the long strips B from the sheet, scrap trim pieces F, G and H are severed from the sheet.

After removal of the first long strip B which passes down through the die, the sheet is preferably advanced so that one width of strip is beyond and overhangs the die edge. Thus when the second and succeeding long strips are cut from the sheet and pass through the die, a short strip C is also severed at each long strip cutting and falls over the front of the die. Cutting of recovery pieces J from both ends of this overhanging strip is what makes the strip that is left, a short strip. This recovery piece cutting is performed immediately after severance of the overhanging strip.

Cutting of the long strips B from the sheet A is preferably effected through the use of a pair of fixed, spaced and parallel die members 11 (Figs. 2, 3 and 4) which are supported in a die block or bed 12. The inner longitudinal sides of the die members are formed with undulated cutting edges 13.

A movable punch member 15 located above the die cooperates with the fixed die members 11 in cutting the sheet. This punch member is formed to enter into the die between the die members 11 and is therefore provided with corresponding undulated sides having cutting edges 16. The punch is vertically reciprocated in any suitable manner in time with the other moving parts, which include feeding of the sheet to its proper cutting positions in the machine. This is a usual scroll shear die construction.

Removal of the trim pieces H from the ends of the long strips B is brought about by operation of trimming transverse end die members 18, only one of which is shown in the drawings. These trimming die members are located near the ends of the die and completely bridge the space between the die members 11. The members 18 are formed with irregular shaped cut edges 19 which sever the trim pieces H from the strips along correspondingly shaped lines of severance K (Fig. 1). A mating cut edge 21 is also formed at the ends of the punch 15 for cooperation with the trimming dies 18.

Removal of the recovery pieces J from the ends of the short strips C is accomplished in part by a fixed recovery blade or auxiliary die 26 which is disposed outside of the scroll die proper. There is one of these blades located at each end of the scroll die although only one is illustrated in the drawings.

The auxiliary die 26 is preferably of irregular contour and is provided with a cutting edge 27 which is disposed as a whole at right angles to the main die steels or members 11. The top surface of the blade cut edge 27 is flush with the top surface of the die cut edge 13. This recovery blade is fixed in a bed extension 28 of the main die block 11.

In the movable punch 15 a right angle extension or movable auxiliary die 29 is provided for cooperation with the fixed auxiliary die 26. This punch extension is formed with a cut edge 31 which is set inwardly at a slightly higher level than the level of the main punch cut edge 16. This difference in levels sets off a short step or shoulder 32 which permits functioning of the main punch cut edge 16 slightly in advance of the auxiliary or punch extension cut edge 31.

Hence when the punch 15 moves down into the die the punch cut edge 16, cooperating with the cut edge 13 of the main die steels 11, severs both a short strip C from an adjacent long strip B and that long strip from the sheet. On the same downward stroke of the punch but at a slightly later time, its extension cut edge 31, cooperating with the cut edge 27 of the fixed auxiliary die 26, cuts the recovery pieces J from the ends of the severed overhanging short strip C. This cutting takes place along a line of severance M (Fig. 1).

By referring to Fig. 1 it will be observed that in order to completely sever a recovery piece from the sheet the transverse line of severance M must necessarily extend the entire width of one strip and meet with or terminate in the longitudinal lines of severance E. A portion of this transverse line of severance M thus necessarily falls across the main die steels 11, as at 33 in Fig. 2. In order to provide for a complete separation at this position a continuing cut edge 34 is formed along this section 33.

To make this cut edge effective at the proper time there is provided a yieldable die device 35 in the main die steel 11. There is one of these devices at each end of the main die adjacent the fixed auxiliary dies 26. Thus the die adjacent the auxiliary die cut edge 27 plus the continuing cut edge 34 provide for a continuous line of severance from edge to edge of a strip.

These yieldable die devices 35 include a depressible die element 36 disposed in a vertical slot 37 formed in the die block 12. The element is vertically guided by a tongue 38 formed on the die block and fitting into a groove 39 provided in the side of the element. The top of the die element is normally flush with the top of the main die steels 11 and its forward or inner edge is formed as a cut edge 41 which is coextensive with the main die steel cut edge 13 and thus forms a continuation thereof. Thus there is no break in the cut edge 13 where the depressible die element is located and such a continuous cut edge is effective for the complete cutting of the outlines of the long strip B which passes down through the die, as already explained.

The die element 36 is maintained flush with the main die steels 11 during the long strip cutting operation by a coiled compression spring 43 which is interposed between the bottom of the die element and a strap 44 which extends across the die slot 37 in the die block 12. This strap is secured by bolts 45 to the bottom of the block. The spring is held in place by a bolt 46 which extends through the strap and through the spring and is threaded into the bottom of the die element. The head of the bolt 46 engages against the strap when the die element is spring held in its uppermost position and thus serves as a stop for limiting the upward travel of the die element.

Thus the die element 36 is yieldably maintained in proper position for cooperation with the main die steels and the punch in severing the strips from the sheet but is also readily depressible by the punch after completion of the long strip cutting operation. This exposes the cut edge 34 in the main die steel adjacent the fixed auxiliary die and thereby permits the movable auxiliary die 29 to come into cutting action to completely sever the recovery pieces J from the overhanging short strip. In other words, the recovery line of cut extends right up to and terminates in the boundary line of the short strip just severed from the long strip.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Apparatus for cutting longitudinal strips and recovery pieces from metal sheets, comprising opposed shearing dies for severing the strips from the sheets, an auxiliary die for severing a recovery piece from a said strip, a portion of said auxiliary die being confined within a said shearing die, and a yieldable element also confined within said shearing die and disposed adjacent said auxiliary die, said yieldable element being movable relative to said shearing die after the severing of said strips to make effective the auxiliary die cutting of said recovery piece.

2. Apparatus for cutting longitudinal strips and recovery pieces from metal sheets, comprising opposed shearing dies for severing the strips from the sheets, an auxiliary die for severing a recovery piece from a said strip, a portion of said auxiliary die being confined within a said shearing die, and a yieldable element also confined within the same shearing die and disposed adjacent said auxiliary die, said yieldable element being movable in its shearing die by operation of the other shearing die after the severing of said strips to make effective the auxiliary die cutting of said recovery piece.

3. In an apparatus for cutting longitudinal strips and recovery pieces from metal sheets, the combination of opposed shearing dies for severing the strips from the sheets, opposed auxiliary dies associated with said shearing dies for cutting the recovery piece from a said strip, a portion of one of said auxiliary dies being formed as a transverse part of a said shearing die, and a yieldable element confined within said shearing die and forming a part thereof and being disposed adjacent said auxiliary die, said yieldable element being movable relative to said shearing die after the severing of a said strip to make effective the cutting of the recovery piece by said auxiliary dies.

4. Apparatus for cutting longitudinal strips and recovery pieces from metal sheets, comprising opposed shearing dies for severing the strips from the sheets, an auxiliary die for severing a recovery piece from a said strip, a portion of said auxiliary die being confined within a said shearing die, and a yieldable element also confined within said shearing die and disposed adjacent said auxiliary die, the top surfaces of the shearing die, the auxiliary die and the yieldable element being normally flush, said yieldable element being movable relative to said shearing die after the severing of said strips to make effective the auxiliary die cutting of said recovery piece.

5. In an apparatus for cutting longitudinal strips and recovery pieces from metal sheets, the combination of opposed shearing dies having undulating cutting edges for severing the strips from the sheets, opposed auxiliary dies associated with said shearing dies for cutting the recovery piece from a said strip, a portion of one of said auxiliary dies being formed as a transverse part of a said shearing die, said auxiliary dies having undulating cutting edges in the same place of cutting as said shearing dies, and a yieldable element confined within said shearing die and forming a part thereof and being disposed adjacent said auxiliary die, said yieldable element being depressible in said shearing die after the severing of a said strip to expose and make effective the cutting edges of said auxiliary die so that the recovery piece will be severed from a said strip.

6. In an apparatus for cutting longitudinal strips and recovery pieces from metal sheets, the combination of fixed and cooperating movable shearing dies for severing the strips from the sheets, fixed and cooperating movable auxiliary dies associated with said shearing dies and disposed beyond said dies for cutting across a said severed strip to remove a recovery piece therefrom, a portion of said fixed auxiliary die being confined within said fixed shearing die, and a yieldable element confined within said fixed shearing die adjacent said fixed auxiliary die and being depressible in the shearing die after the severing of a said strip to make effective the cross cutting of an advanced severed strip.

7. In a scroll shear die, the combination of a blanking die having two undulated cutting edges, said blanking die being arranged to blank out from a sheet a scroll edge blank and leave a severed portion of the sheet in advance thereof, auxiliary die members having cutting edges leading into a said undulated cutting edge of said blanking die, and yieldable die elements which carry a part of said undulated cutting edge and which are depressible after the cutting action of said blanking die to make effective the cutting action of said auxiliary dies.

8. In a scroll shear die, the combination of a blanking die having two undulated cutting edges and transverse end cutting edges, said blanking die being arranged to blank out from a sheet a cut-to-length scroll edge blank and leave a severed portion of the sheet in advance thereof, auxiliary die members having cutting edges leading into a said undulated cutting edge of said blanking die for cutting recovery pieces from the ends of the advance severed portion so that it will be of predetermined length, and yieldable die elements which carry a part of said undulated cutting edge and which are depressible after the cutting action of said blanking die to make effective the cutting action of said auxiliary dies.

9. Apparatus for cutting metal sheets, comprising in a shearing die, the combination of a shearing edge, an auxiliary cutting edge disposed at an angle to and extending into said shearing edge, said shearing edge and said auxiliary cutting edge being in the same plane, and a yieldable element confined within the shearing die and disposed adjacent said auxiliary cutting edge, said yieldable element being movable relative to the shearing die after a cutting action along said shearing edge to make effective a cutting action along said auxiliary cutting edge.

10. Apparatus for cutting longitudinal strips and recovery pieces from metal sheets, which comprises opposed shearing dies for severing the strips from the sheets, an auxiliary die for separating a recovery piece from a said strip, a portion of said auxiliary die being confined within a said shearing die, a vertically movable die element confined in a slot of said shearing die and disposed adjacent said auxiliary die, a compression spring located under said vertically movable die element, a support for said spring disposed across said slot, and means for normally maintaining the top of said vertically movable die element flush with the top of said shearing dies, said vertically movable die element being depressible in its slot after the severing of said strips to expose and make effective the auxiliary die cutting of the recovery piece.

WILSON R. HULL.